Figure 1:
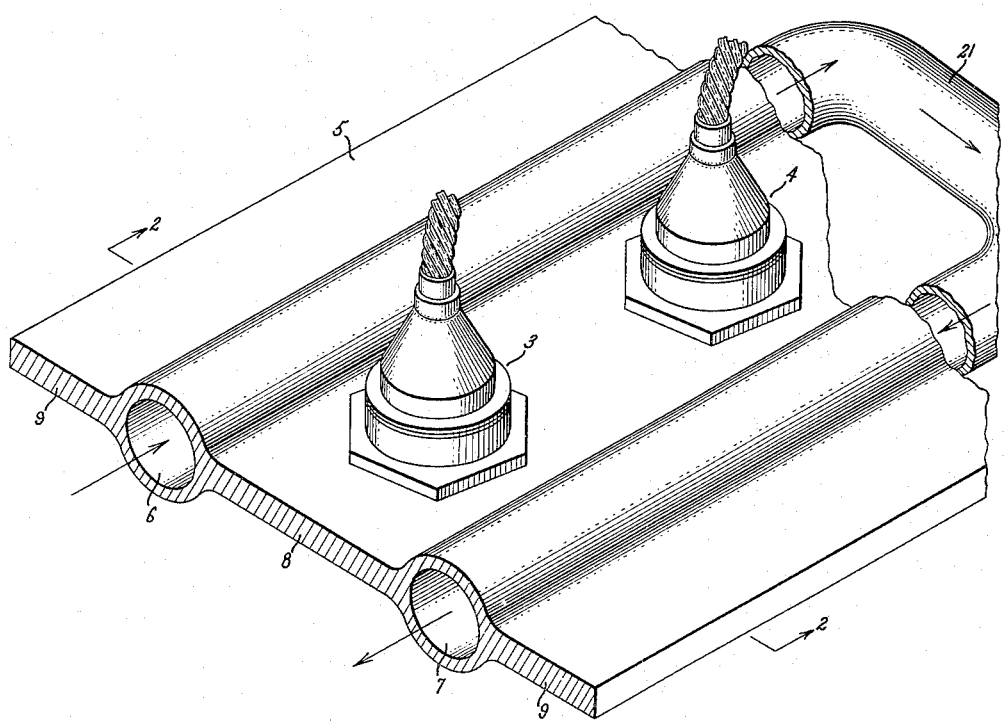

July 11, 1961   H. T. HIMEON ET AL   2,992,372
LIQUID COOLED CURRENT RECTIFIER APPARATUS
Filed May 4, 1959

Inventors:
Harold T. Himeon
Ralph E. Wahl,
by William D. Roberson
Their Attorney.

United States Patent Office 2,992,372
Patented July 11, 1961

2,992,372
LIQUID COOLED CURRENT RECTIFIER APPARATUS
Harold T. Himeon, Burlington, Vt., and Ralph E. Wahl, Broomall, Pa., assignors to General Electric Company, a corporation of New York
Filed May 4, 1959, Ser. No. 810,613
5 Claims. (Cl. 317—234)

The present invention relates to electrical rectifying equipment and more particularly to liquid cooled rectifier assemblies including arrangements for the mounting, cooling, and electrical connection of semi-conductor rectifier cells.

Current rectifiers including relatively large area of contact surfaces upon wafers of semi-conductive materials are noted for their ability to pass extra-ordinarily large currents unidirectionally. Rectifying cells of this nature having current carrying capacities which are large in relation to their physical sizes or thermal masses do however tend to overheat in operation and to destroy themselves unless their heat losses are properly dissipated. Heat radiating fins have thus come into use with such cells, these fins being disposed to provide the necessary heat transfers to circulated cooling media. Both liquid and air cooling systems have been employed heretofore with such cells.

Rectifier apparatus of large output capacities and complex circuitry commonly include many numbers of rectifier cells, such as the popular and promising silicon cells, with the result that the physical constructions of rectification equipment tend to become bulky and complicated. In these large and complicated systems the need for easy access to service the equipment becomes harder to satisfy, cooling becomes a more difficult problem, and shutdown intervals for routine cleaning and cell substitutions are likely to be unduly prolonged especially since it sometimes is necessary to drain the coolant from the cooling system before removal of the cells.

Accordingly, it is one of the objects of the present invention to provide improved liquid cooled rectifier assemblies wherein heat losses are dissipated with high efficiencies in construction of minimum bulk.

It is an additional object of this invention to provide a high efficiency liquid cooled rectifier arrangement in which the individual rectifying cells may be removed for servicing or replacement without disturbing the cooling system or breaking liquid tight seals.

By way of a brief summary of a preferred embodiment of this invention, we provide a liquid cooled copper bus structure of a tube in strip construction having a pair of passages for conducting streams of forced liquid coolant. These passages are arranged in spaced-parallel relationship and are joined by an integral flat web which forms part of the bus structure. To this bus structure is affixed a row of dry rectifier cells joined in heat conducting relationship to the web between the two passages. The presence of the liquid conducting passages on each side of each cell promotes rapid and efficient cooling of the cells while the mounting of these cells on the web separating the passages permit the removal of each cell either individually or collectively without tampering with the flud passages or draining their contents.

Figure 2:
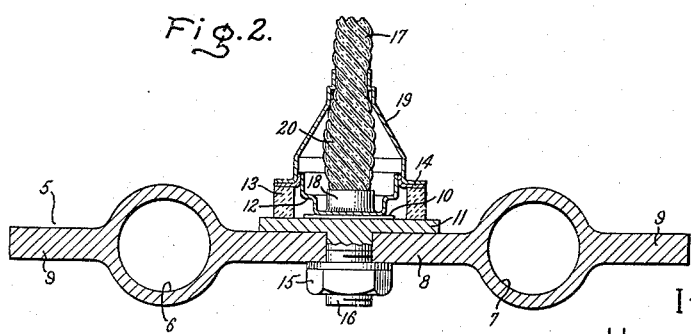

Although the features of this invention which are believed to be novel are expressed in the appended claims, details of the invention and the further objects and advantages thereof may be most readily appreciated through reference to the following description taken in connection with the accompanying drawings in which:

FIG. 1 shows a bus structure with rectifying cells affixed thereto in accordance with this invention; and FIG. 2 is a cross-sectional view taken on line 2—2 of FIG. 1.

In FIG. 1 can be seen a row of sealed rectifier units 3 and 4, of which only two are shown, mounted on a solid copper bus structure 5. The bus structure is of tube-in-sheet construction, a fabricated material now widely used for heat exchangers. In this example, the tube-in-sheet is employed not only as a heat exchanger but also as a heavy current-carrying bus bar. The bus structure contains two passages 6 and 7 through which a forced coolant fluid, such as water, is directed. The coolant is transmitted through the interior of passage 6 in the direction shown by the arrows passed rectifier units 3 and 4 and, for reasons set forth more fully hereinafter, is preferably returned through the passage 7 in the opposite direction. In the space between the passage 6 and 7 is a flat web 8 which forms a convenient mounting place for the row of rectifier units. Additional flanges 9 provide extra heat dissipating surface on the bus structure.

The rectifier cell enclosures mounted on the liquid cooled bus structure are hermetically sealed units which provide connections for a unilaterally conducting semi-conductor wafer enclosed within as well as means for conducting heat therefrom in order to maintain the operating temperature of the wafer at a safe value. As seen in FIG. 2 the rectifier cell enclosure comprises a unilaterally conducting wafer 10 of semi-conductor material, such as silicon, sandwiched between a metallic plate 11 and the closed end of a metallic cup 12. One contact surface of the wafer is in conductive engagement with a central area of the metallic plate 11, which is large enough to provide a border area surrounding this central area. The closed end area of the metallic cup 12 has a surface area which is the same or smaller than the other contact surface of the wafer so that the edge area of the wafer is exposed. This assembly is enclosed by a hollow body 13 of electrically insulating material, such as ceramic, affixed at one end thereof to the border area of the metallic plate 11 and at its other end to an inwardly extending annular metallic member 14. This annular member has an axially extending portion which is joined with the telescoping open end of the contact cup 12 by a welded joint. The enclosure is rendered air tight by metalizing the opposite ends of the ceramic cylinder 13 and bonding these ends respectively to the base plate 11 and the annular member 14. Further details of the hermetically sealed enclosure are described more fully and claimed in the U.S. Patent to Colleran et al. No. 2,756,374 issued July 24, 1956, and assigned to the same assignee as that of the present application.

An ordinary nut 15 engages a threaded bolt-like member 16 affixed to the bottom of base plate 11 to afford a firm electrical contact with the bus structure and, at the same time, an intimate heat exchanging engagement of the rectifier cell enclosure with the web 5. Electrical contact is made to the opposite terminal of the semi-conducted wafer through the medium of an electrical cable 17 having a stud 18 swaged to its end and soldered within the bottom of the contact cup 12. In order to prevent strains from being transmitted through the cable 17 to the fragile semi-conductor wafer, a hollow support 19 in the form of a truncated cone connects an intermediate portion of the cable 17 to the metallic member 14 at the top of the insulating ring 13. This hollow support is preferably affixed by soldering at its wider end while its narrower end is swaged into compression with the cable to form a solid physical connection. During fabrication of the unit the cable is compressed axially to form a bowed out portion 20 intermediate the swaged connection and the stud 18 to insure permanent electrical connection without the possibility of pulling the cell apart by thermally induced contractions of the cable.

As can be seen, each of the rectifier cells is firmly affixed to the bus structure such that the heat dissipating element is in intimate heat exchange relationship with the bus structure and, through it, to the coolant flowing in passages 6 and 7. The arrangement provides ample cooling for each rectifier unit, but nevertheless permits each rectifier to be easily removed individually of the others without the necessity of opening the coolant passages. It is therefore unnecessary to drain the cooling system when replacing any of the rectifier cells and the down time of the rectifier system for repair purposes is conveniently short. As a matter of fact, rectifier cells can be removed and replaced even while the remaining cells are conducting load currents.

A further advantage is achieved through the use of two coolant passages through which the coolant is circulated in opposite directions. The single factor which most limits current carrying capacity of semi-conductor cells seems to be the instantaneous temperature of the unilaterally conducting element. When a number of rectifier cells are in common circuit either in parallel or in series the total current carrying capacity of the combination is limited by the temperature of the hottest cell. Within the capacities of a given cooling system the temperatures of the rectifying cells on the bus structure of FIG. 1 can be very nearly equated by forcing the coolant in one direction through one passage and returning the same coolant in the opposite direction through the other passage. This may be accomplished by providing a U-shaped connector 21 at the opposite end of the bus structure to direct the coolant from passage 6 to passage 7. With such an arrangement the temperature differentials along the path of the coolant as its courses through the bus structure passages causes each rectifier cell in the row to receive approximately the same amount of cooling. As a result the current carrying capacity of the row of rectifier cells is maximized and all the cells operate at about the same temperature.

The simplicity of the arrangement described herein lends itself well to its incorporation in power rectifier assemblies of a wide variety of current ratings. It is, in effect, a modular construction, since the bus structure may be as long as convenient or as short as necessary to accommodate any reasonable number of rectifier cells.

While we have shown and described but one embodiment of this invention, it is to be understood that the arrangement depicted is illustrative in nature and that certain variations within the true spirit and scope of the invention will undoubtedly occur to those skilled in the art to which these teachings contain.

What we claim as new and desire to secure by Letters Patent of the United States is:

1. A cooled rectifier assembly comprising: an electrically conducting bus bar comprising a pair of spaced-apart, parallel hollow liquid carrying passages formed within and extending longitudinally through the interior of said bar so as to be joined by an integral generally planar web and, a plurality of electrical rectifying cells mounted between said passages in heat exchange relationship with said web.

2. Current rectifier apparatus comprising: an electrically conducting bus bar having a pair of spaced-apart passages formed within and extending longitudinally through the interior thereof for conducting streams of forced liquid coolant and having a generally planar web integral with said passages and spanning the distance therebetween; and a plurality of electrical rectifying cells mounted in a row between said passages in heat exchanging relationship with said web.

3. Current rectifier apparatus comprising: an electrically conducting bus bar having a pair of spaced-apart passages formed within said bar and extending longitudinally from end to end therethrough for conducting streams of forced liquid coolant and having a generally planar web integral with said passages and spanning the distance therebetween longitudinally extending flanges between each of said passages and the corresponding lateral edge of said bar; a plurality of electrical rectifying cells mounted in a row between said passages in heat exchanging relationship with said web; and a U-shaped passage connecting said pair of passages at one end of said bus such that the same coolant traverses said bus in opposite directions longitudinally of said bus structure to maintain each of said rectifying cells at approximately the same temperature.

4. Current rectifier apparatus comprising: an electrically conducting bus bar structure of elongated generally planar configuration having as an integral part thereof a pair of parallel passages disposed within the body of said bar and extending longitudinally through the interior thereof to conduct a liquid coolant through said bus structure; and a plurality of electrical rectifying cells mounted in a row parallel to and between said passages with one rectifying terminal of each cell in intimate electrical and thermal contact with said bus structure.

5. Current rectifier apparatus comprising: an electrically conducting bus bar structure of elongated generally planar configuration having as an integral part thereof a pair of longitudinally extending parallel passages disposed within the body of said bar extending from end to end through the interior thereof to conduct a liquid coolant through said bus structure and having a pair of longitudinally extending lateral flanges, each disposed between one of said passages and a corresponding lateral edge; a plurality of electrical rectifying cells mounted in a row parallel to and between said passages with one rectifying terminal of each cell in intimate electrical and thermal contact with said bus structure; and a connecting passage at one end of said bus structure linking said pair of passages such that all the coolant flowing through one of said passages flows likewise through the other of said passages but in an opposite direction longitudinally of said bus structure, whereby each of the rectifying cells on said bus structure is exposed to approximately the same cooling action.

References Cited in the file of this patent

UNITED STATES PATENTS

| | | |
|---|---|---|
| 2,474,809 | Abbott | July 5, 1949 |
| 2,501,331 | Hein | Mar. 21, 1950 |
| 2,718,615 | Riley | Sept. 20, 1955 |
| 2,842,722 | Diebold | July 8, 1958 |